US 6,819,339 B1

United States Patent
Dowling

(10) Patent No.: US 6,819,339 B1
(45) Date of Patent: Nov. 16, 2004

(54) WEB BROWSER WITH MULTILEVEL FUNCTIONS

(76) Inventor: Eric Morgan Dowling, 5107 5$^{th}$ Ave., Holmes Beach, FL (US) 34217

( * ) Notice: Subject to any disclaimer, the term of this patent is extended or adjusted under 35 U.S.C. 154(b) by 0 days.

(21) Appl. No.: 09/512,046

(22) Filed: Feb. 24, 2000

(51) Int. Cl.$^7$ .................................................. G09G 5/00
(52) U.S. Cl. ....................... 345/738; 345/739; 345/749; 707/3; 707/4; 707/5
(58) Field of Search ............................... 345/738, 739, 345/744, 745, 746, 747, 749; 707/3, 4, 5, 6

(56) References Cited

U.S. PATENT DOCUMENTS

| | | | | |
|---|---|---|---|---|
| 6,006,252 A | * | 12/1999 | Wolfe | 709/203 |
| 6,175,830 B1 | * | 1/2001 | Maynard | 707/5 |
| 6,202,061 B1 | * | 3/2001 | Khosla et al. | 345/804 |
| 6,278,993 B1 | * | 8/2001 | Kumar et al. | 707/3 |
| 6,282,548 B1 | * | 8/2001 | Burner et al. | 707/10 |
| 6,295,526 B1 | * | 9/2001 | Kreiner et al. | 707/1 |
| 6,313,855 B1 | * | 11/2001 | Shuping et al. | 345/738 |
| 6,334,145 B1 | * | 12/2001 | Adams et al. | 709/217 |
| 6,338,059 B1 | * | 1/2002 | Fields et al. | 707/10 |
| 6,381,637 B1 | * | 4/2002 | Kamada | 707/501.1 |
| 6,415,278 B1 | * | 7/2002 | Sweet et al. | 707/2 |

* cited by examiner

Primary Examiner—Ba Huynh
(74) Attorney, Agent, or Firm—Eric M. Dowling

(57) ABSTRACT

A architecture is provided to enable a client web browser to conduct and manage a multilevel search. The browser includes an application layer interface. The application layer interface is for coupling to network via a protocol stack. The browser also includes a markup language parser. The parser receives information from the application layer interface. The browser also includes a graphical user interface for interacting with a user. The graphical user interface allows a user to specify a set of multilevel search parameters. The browser also includes a markup language processor that receives input from the markup language parser and multilevel search parameters from the graphical user interface. The markup language processor conducts and manages a multilevel search to find specified information on a current web page or a web page referenced by the current web page in accordance with a parameterized search tree. The present invention also enables an automatic processes to print sets of linked web pages and to generate sitemaps, filtered sitemaps, filtered results pages in accordance with user specifications.

35 Claims, 6 Drawing Sheets

WEB BROWSER WITH MULTILEVEL FUNCTIONS

BACKGROUND OF THE INVENTION

1. Field of the Invention

This invention relates generally to network client devices and programs. More particularly, the invention relates to a web browser that provides automated multilevel-search-related functions.

2. Description of the Related Art

The Internet enables companies and individuals to post information using an interconnected set of web pages. A first web page is connected to a second web page using a hyperlink. The HTTP protocol is used to transfer data across the Internet from one machine to another so that when a user clicks on a hyperlink in a web page, the web page referenced by the hyperlink is accessed. The action of a user clicking on a sequence of links to move from one web page to another is known as "surfing the web" or "web browsing." Typically a client software system known as a "web browser" is used to this end. Search engines are provided to help a user find web pages related to a specific topic. Typically a search engine maintains a database of web pages and performs searches based on keywords found in the web pages. In most cases the search engine is implemented within a web server as opposed to a client device.

While web browsers are very useful, prior art web browsers are in many ways limited. For example, most browsers contain a search mechanism known as "find in page." In the Microsoft Internet Explorer, the "find in page" feature works by having a use activate the "edit" menu and then the "Find (on this page)" submenu. Alternatively the user may select CRTL+F in order to activate the "find in page" menu. When the user selects "find in page" a dialog box appears. A user is able to enter a word into this dialog box. If the word is in the markup file currently loaded into the web browser, the word will be highlighted to the user.

While the "find in page" feature found in prior art web browsers is useful it lacks desirable functionality. For example, a current web page loaded into a browser usually includes one or more hyperlinks. If the desired word is on a page pointed to by any of the hyperlinks of the currently loaded page, the "find in page" feature would turn up a negative result. This forces the user to select each hyperlink and then perform a separate "find in page" search on each page referenced by the current page. In some cases this can be most distressing to the user, for example when the current page contains very many hyperlinks or has a richly link-nested structure. In such cases the user is forced to spend undue time searching for the desired word. It would be desirable to have a browser or a browser plug-in that would facilitate word and concept searches through multilevel document structures. Such a browser would increase the productivity of network users. It would also be desirable to allow a user to print pages linked to a given base level document or perform other page-specific functions to a nested structure of linked pages without needing to manually access and specify operations for each page.

Another area where a more powerful web browser is needed is caused by poor server systems. For example, when visiting a certain company's web site user may be presented with a search engine specific to that web site. In some cases these search engines produce a lot of results that are irrelevant. In many cases the keywords requested in the search do not even appear in the returned web pages. For example a user may run a search and receive 450 results, but only three of these are of interest. To process such an output, the user must spend undue time hunting for the three documents of interest among the 450 results. For example these 450 results are displayed 20 per results page. The user then views each results page, clicks on each link that may be of interest, and views the contents thereof. When each page is accessed, the user uses a "find-in-page" search to determine whether the keyword is actually found in the document and if so, the context of its use. It is also problematic that the user has to select a "next" link to get another page of 20 page titles to view. Sometimes it can take tens of seconds or more to access the next set of titles. It would be desirable to have a web browser with built-in intelligence that could automate the process of wading through irrelevant search results. Other related client-side search acceleration techniques are also needed to allow a user control over searching instead of being limited by the abilities of a distant server's search facilities.

SUMMARY OF THE INVENTION

The present invention overcomes difficulties with prior art web browsers by providing novel searching techniques. Instead of considering a network search engine to be an external server, the web browser of the present invention takes on search engine functionality. While prior art web browsers offer "find in page" word-search capabilities, the web browser of the present invention allows users to search for words and/or concepts using a multilevel search. In a multilevel search, a user specifies a set of search parameters plus a number of levels to search. In some case the number of levels to search may be set by a default value or may be derived intelligently on-the-fly.

To perform a multilevel search, the web browser usually first checks the current page for the search term. If the term is not found, it goes through the set of hyperlinks and checks each page hyperlinked to the current page. If any of the linked pages contain the desired word or concept, that page is flagged for the user to view. The user can then press a "find next" button to continue the search. Alternatively all of the results can be logged and loaded up for viewing similar to a search engine results page.

In accordance with an aspect of the present invention, while the user is viewing a first result, the browser can optionally seek out further results in the background. This functionality is useful because documents in the search need to be gathered from diverse network addresses and may incur delays. In accordance with another aspect of the invention the user may select an option that causes some or all of the pages within a linked tree of documents to be printed without the need to view each page and then manually select "print page."

Other aspects of the present invention allow a user to build a sitemap to characterize and otherwise extract information from a linked structure of web pages. Another aspect of the present invention enables enhanced searching of both single-level and multilevel documents. The "find in page" search is expanded to allow users to specify combinatorial searches that are applied to document substructures.

The present invention allows a user to take control away from a server. Presently a user is at the mercy of a poor search engine. When a search engine is incorporated into a web site, the user has no option but to select the provided search engine. Even when the user can select search engines, the search engine often provides unrelated results. The present invention puts controls in the hands of the user that automate the processes involved in sifting through results and looking for specific types of documents that may be found on a given web site. The present invention also allows a user to automatically characterize the contents of a web site by building a sitemap or a filtered site map. The processes and structures of the present invention vastly improve user productivity for performing web-related tasks.

BRIEF DESCRIPTION OF THE FIGURES

The various novel features of the present invention are illustrated in the figures listed below and described in the detailed description which follows.

DETAILED DESCRIPTION OF THE PREFERRED EMBODIMENTS

Figure 1:
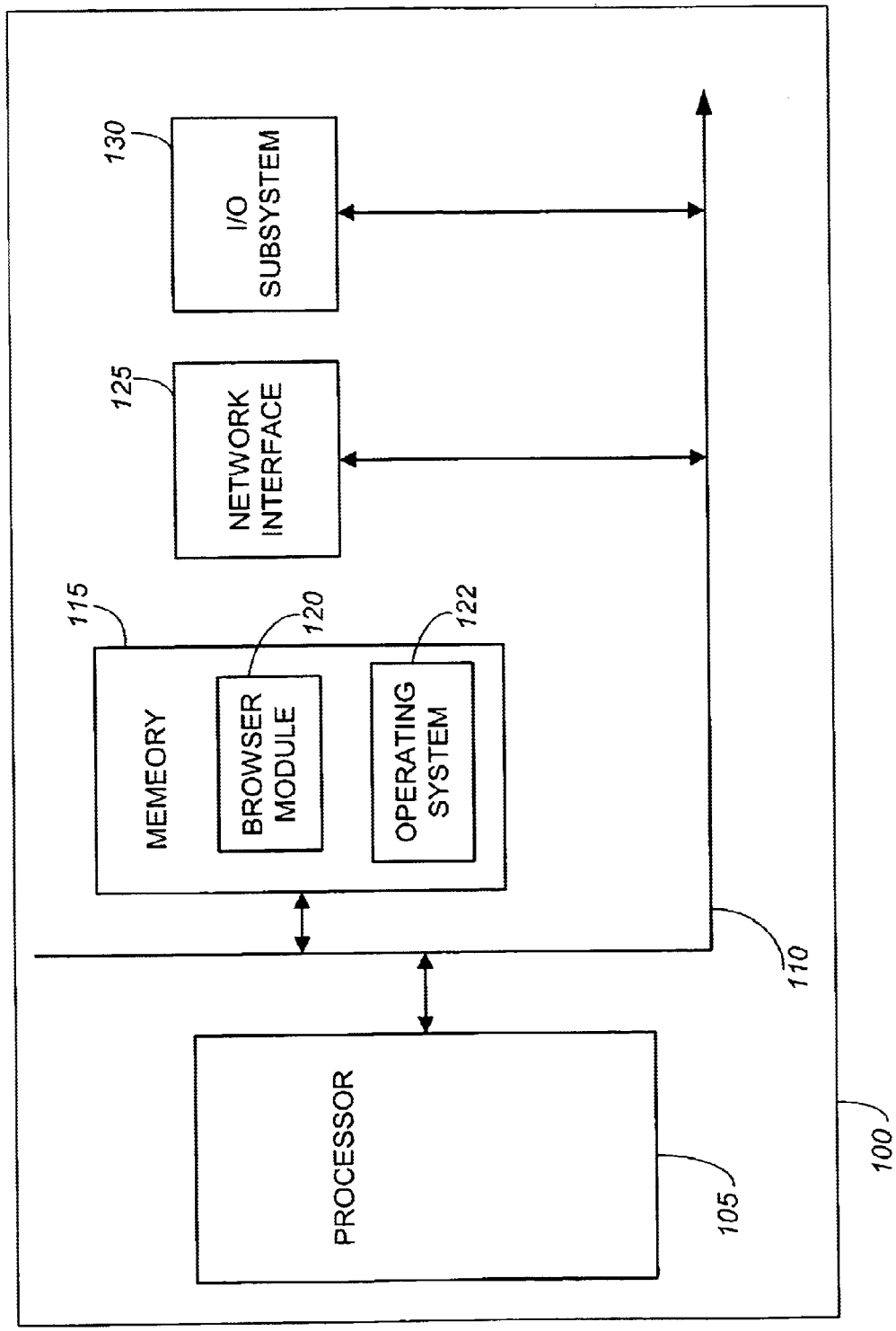
FIG. 1 is a block diagram illustrating a computer system in accordance with the present invention that us configured to with a multilevel browser program.

FIG. 1 is a block diagram representing an embodiment of a computerized device 100 designed in accordance with the present invention. The computerized device may be embodied as a desktop computer, a handheld computer, a networked web appliance, a cellular or PCS phone, or may be integrated into another type of system such as a home entertainment system. Skilled artisans will readily realize the device 100 may be implemented in various types of housings and may be embedded into various types of systems without departing from the scope of the present invention.

The computerized device 100 includes a processor 105. The processor 105 may be implemented using a standard microprocessor such as a Pentium™ processor from Intel Corp., a RISC type processor, or any other processor or microcontroller. The processor 105 is coupled to a bus 110. The bus 110 may be implemented in some systems using a hierarchical plurality of busses connected via bus bridges. Such hierarchical bussing systems are common in workstations and PC's. For example the bus 110 may include a local bus bridged to a PCI bus, and the PCI bus may be bridged to an ISA bus. All such configurations, to include a simple external processor bus are examples of the generic bus 110. Coupled to the bus 110 is a memory 115. Again the memory 115 may be implemented using a single memory device or may be implemented with a plurality memory devices arranged in a hierarchical cache based structure. The memory 115 may also be implemented as any combination of SRAM, ROM, EEPROM, and DRAM, and disk for example. The memory 115 includes bit-codings for a browser module 120. The browser module encoded into the memory 115 is designed in accordance with the present invention. In systems where the memory 115 includes DRAM or SRAM and a disk, the browser program will typically be loaded from the disk into the DRAM or SRAM and executed out of the DRAM or SRAM. If the browser is stored in EEPROM or ROM, it may be loaded into RAM or executed directly from the nonvolatile memory.

The memory 115 also preferably includes an operating system 122. The operating system provides software to allow application programs such as the web browser 120 to communicate with hardware resources. In specialized devices the application functionality of the web browser 120 may be merged with the operating system 122, or a dedicated micro kernel may be developed. Even in specialized hand held devices it is preferable to separate hardware layer and application layer functions using a standard version of the operating system 122. The operating system 122 is preferably implemented as a Windows NT™, Windows 2000™, or Windows CE™ operating systems from Microsoft, Inc., Solaris™ from Sun, or any other commercially available operating system. Various other operating systems are being developed for the wireless handheld market. The selection of the operating system 122 is a design detail that does not weigh into the scope of the present invention.

Also coupled to the bus 110 is a network interface 125. The network interface 125 may be a network interface card (NIC), an analog modem, or a faster modem such as an xDSL or cable modem. If the device 100 is a handheld device, the network interface may include a cellular or PCS connection or any other type of wireless network interface. In such systems the network interface may include cellular telephone functionality as well as wireless data services. A mobile IP protocol is preferably supported in the network interface of such systems.

The device 100 also includes an I/O system 130. The I/O system 130 preferably involves a display monitor and a set of display drivers. The I/O system also preferably involves an input device such as a mouse and/or keyboard/keypad. In some embodiments, the I/O system 130 may involve an audio interface. In such systems web content is provided to the user using text-to-speech and inputs are accepted via speech recognition. In general, the I/O system provides a means for the user to interact with the web browser module 120. Any subset of the components of the computerized device 100 may optionally be integrated onto a single IC die.

The operation of the computerized device 100 follows standard computer techniques. The novel aspect of the computerized device 100 is encoded into the browser module 120. The browser module 120 and its operation are discussed in connection with the subsequent set of figures. Hence the details of program execution-operation of the computerized device 100 is understood to a skilled artisan in connection with FIGS. 2–6.

Figure 2:
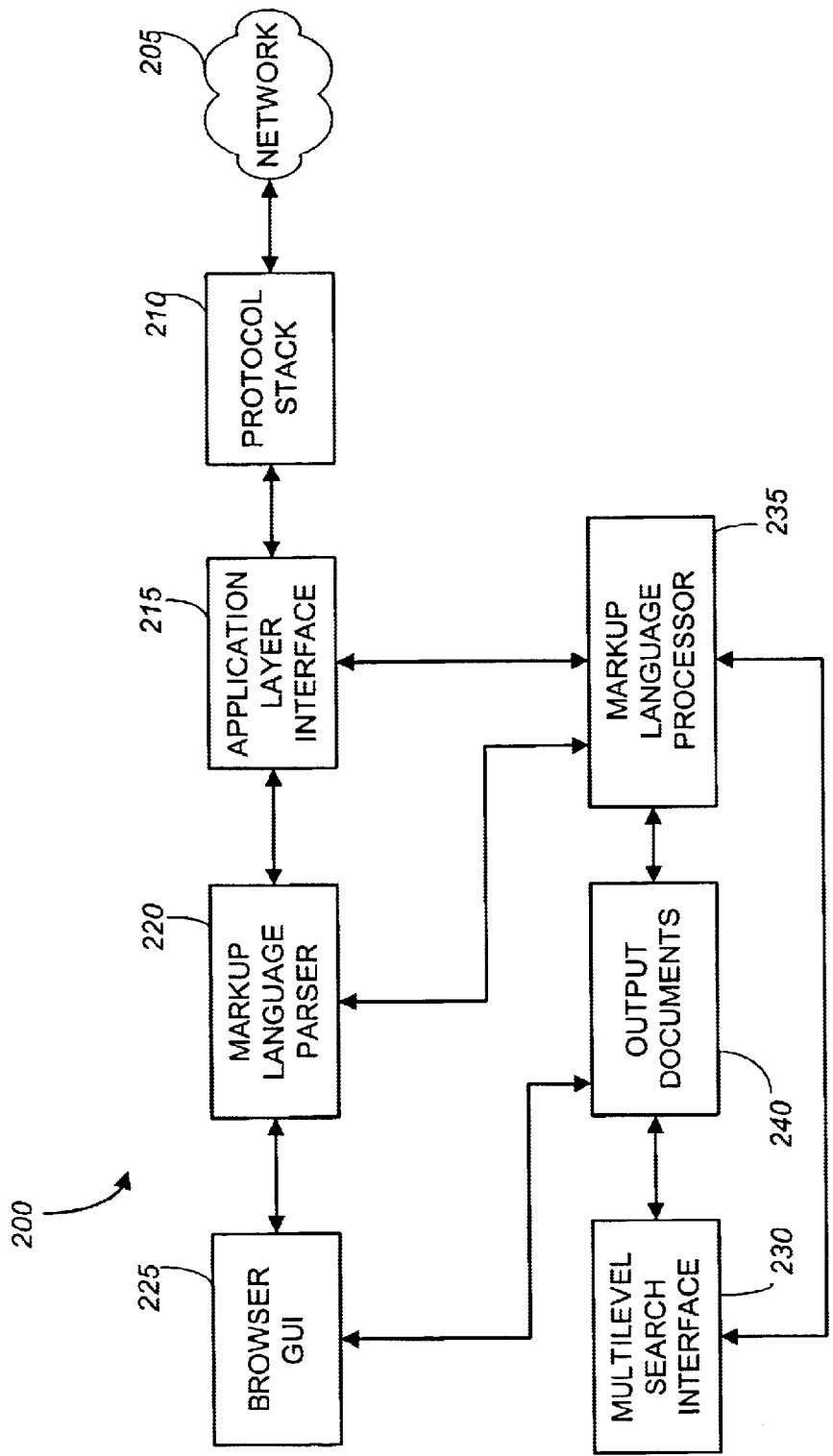
FIG. 2 is a block diagram representing an embodiment of a browser module with multilevel search capabilities.

Referring now to FIG. 2, block diagram representative of an embodiment of a multilevel-search web browser 200 is illustrated. The web browser 200 is coupled to a network 205. The network 205 may be any type of network such as a wireline, wireless, or optical network. The network 205 represents the Internet, a corporate intranet, a PCS data services network, or any other combination circuit switched and/or packet switched networks. In order to describe a preferred embodiment, without limitation, the network 205 will be considered to be the Internet henceforth.

The web browser 200 is coupled to the network 205 using a protocol stack 210. The protocol stack 210 may be part of the browser software in specialized devices, but is preferably supplied by the computer operating system 122. In most embodiments the protocol stack 210 is a part of the operating system 122 or the network interface 125 as opposed to the web browser module 120, 200.

The web browser 200 interfaces to the protocol stack 210 via an application layer interface 215. The application layer interface typically implements at least aspects of the hypertext transfer protocol (HTTP). As web browsing evolves, it is contemplated that other protocols may replace HTTP. Hence the application layer interface 215 may in general implement any application layer interface. The application layer interface 215 may likewise implement session layer and presentation layer functionality in accordance with the OSI model.

The application layer interface is operatively coupled to a markup language parser. The markup language parser parses the application layer information. In current systems the application layer data typically involves HTML web pages. A newer technology known as XML allows customized markup languages to be designed. Various dialects of XML are being developed. Hence the language parser may parse HTML, any type of XML, or more generally any type of markup or document-structure language. For example the language parser 220 may parse VoiceXML, also known as VXML. In preferred embodiments, the markup language parser parses a markup language document that is received via the application layer interface.

The markup language parser 220 is coupled to a browser GUI (graphical user interface). The GUI may involve a standard web browser GUI as is currently provided by the Netscape Navigator™ or the Microsoft Explorer™. Alternatively, the browser GUI may be specialized for use with hand held devices. The Spyglass Prism™ is an example of a web browser designed for use with small-screened hand-held devices. Also, the browser GUI may involve a voice interface as is common on VXML based systems. Hence the browser GUI may use audio signals instead of graphic signals. In general, the browser GUI is a user interface that allows a user to interact with the web browser to enter network requests and to receive (view or hear) information obtained from the network. The browser GUI may involve a mouse, pointer device, a speech recognition interface, a set of buttons, or standard windows based display.

Coupled to the browser GUI 225 is a multilevel search control interface 230. The multilevel search interface 230 allows a user to enter information specific to a browser-initiated multilevel search. A preferred embodiment of the multilevel search interface is discussed in further detail in connection with FIG. 3. The multilevel search interface 230 is typically implemented in the same technology as the browser GUI 225. The multilevel search interface 230 may be an integral part of the browser GUI 225 or may be implemented as a plug-in, for example using JAVA™ technology from Sun Microsystems, Inc. The multilevel search interface 230 may also be implemented using XML or VXML voice I/O or may otherwise be specialized for use with small screen devices using dedicated physical buttons or other specialized input means.

The multilevel search interface 230 is operatively coupled to a markup language processor 235. The markup language processor 235 is also operatively coupled to the markup language parser 220. The markup language processor is optionally operatively coupled to an output document 240. The output document 240 may be stored in the memory 115, to include disk. The output document is also coupled to the browser GUI 225. It should be noted that a given embodiment may omit certain connections and may use some connections shown as bidirectional in only one direction. The embodiment shown may be pruned down to meet such embodiments or other couplings may be added without departing from the scope and spirit of the present invention.

In operation, the browser 200 receives a web page via the protocol stack 210 into the application layer interface 215. For example, the web page may be an HTML web page containing search results from a web server's search facility. To understand the invention, consider an example where the returned results include 400 hits, listed at 20 hits per page. Each listed "hit" corresponds to web page title or content-summary information and a hyperlink to a web site. In this example the search engine returned a lot of "junk," i.e., pages that do not even contain the keywords specified in the initial search. The user then specifies via the multilevel search interface 235 a "one-level search" with a "next-to-end" and a keyword. The "one level search" means to check each hyperlink referenced in the results page for the keyword, but not to check any further. That is, no hyperlinks on any pages referenced from the results page will be accessed. The "next-to-end" parameter instructs the browser to follow the "next" link all the way to the end. Recall that the search engine returns 20 results per page and the user needs to click the "next" hyperlink at the bottom of the page to get to the next 20 results.

With the search specified, the markup language parser 220 parses the loaded web page. In one embodiment the markup language parser 220 optionally first checks the currently loaded page for the keyword. This is useful especially for searches where the current page is not a results page but a page of text mixed with hyperlinks. In this example the keyword is not found in the currently parsed results page. Hence the parser detects each hyperlink in the results page and activates each one. Next it parses the returned page and searches for the keyword. If the keyword is found, the browser either starts building a "filtered results page" or displays the returned page to the user with the keyword highlighted. In this second embodiment, the user can click "find next" to continue the search.

In a preferred embodiment, while the user is viewing a given page, the browser makes one or more subsequent network accesses in the background. Hence while the user pauses to review the use of the keyword in a given page, the browser is automatically making one or more other accesses to load up a next page for searching and reviewing. The operation of the web browser 200 is explained in further detail in connection with FIGS. 3–6.

A second example of the use of the browser involves evaluating a web site. Suppose a user visits a web site run by a company. The user is performing research about this company and its products. In some cases the company has a search engine and in other cases it does not. All too often the search engine provided by the company is inefficient. An example use of the present invention for processing results of an inefficient search engine is given above.

In the second example, the user wishes to search all web pages starting at a route web page for a word or a concept. A concept may be specified as a Boolean keyword search or a natural language search expression, or a compartmentalized search entry-form, for example. The user enters the concept and indicates to search to the deepest level found on the present server. That is, hyperlinks will be followed until they lead to a different server or a server operated by another network entity. The search operates similarly to the one described above, except the tree structure specification of the search differs.

The user may also select other options such as "download pdf files" or "print all pages" or "print all pages meeting search criteria." Similarly the search may stop when a pdf file is found or a page with the keyword is found, and the user may then make the print or download decision. In another embodiment the system reports the total number of pages to print or pdf files to download before going ahead with those operations. This prevents undue waste in cases where there is more information than anticipated. The present invention also optionally builds a tree-structured sitemap of the web site and optionally lists specified types of resources found. For example each node may include a title, number and titles of pdf files, number of links, number of occurrences of keywords, whether or not the page matches a Boolean criterion, or other user-specified information to be collected. A method for building a sitemap is discussed in more detail in connection with FIGS. 4 and 5. The sitemap information is sent to the output document 240. The output document 240 is read by the browser GUI 225 for interactive user viewing and manipulation.

Figure 3:
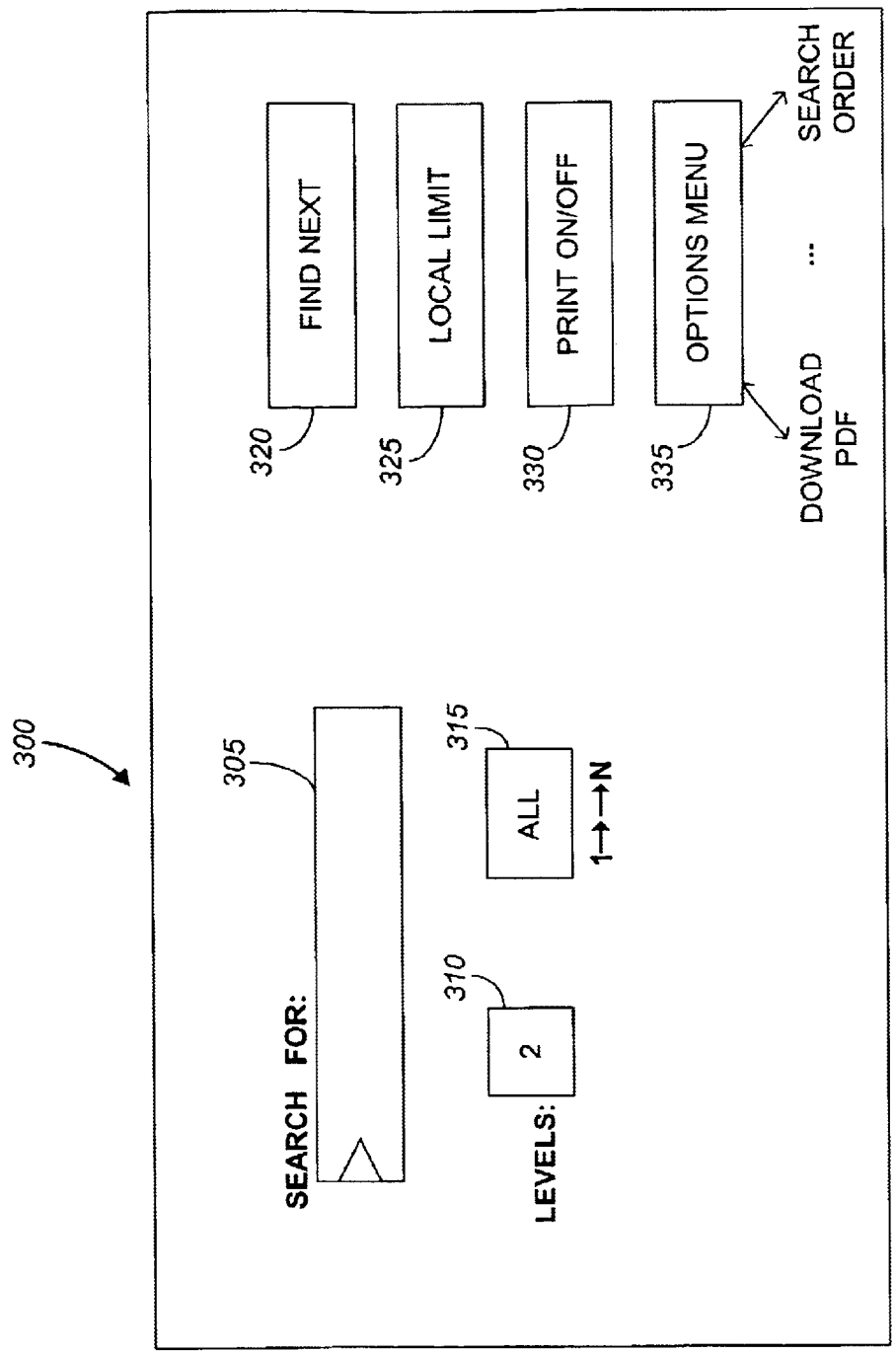
FIG. 3 is a block diagram illustrating an exemplary GUI window used to control multilevel search-based browsing in accordance with the present invention.

Referring now to FIG. 3, an exemplary multilevel GUI dialog window 300 is illustrated. In a preferred embodiment the multilevel GUI window 300 is implemented as a computer window superimposed on a computer display monitor. In alternative embodiments the multilevel GUI is implemented using dedicated keys, a VXML IVR (interactive voice response) interface, or a combination thereof. In general any user interface technology may be used.

The multilevel GUI dialog window 300 includes a search parameters window 305. The user may enter a word into this dialog box similarly to prior art "find in page" interfaces. In some embodiments, this window may also be used to enter Boolean keyword searches an/or natural language concept searches. The search parameters window 305 may be designed to accept one or more search parameters to be used with any desired search methodology.

The multilevel GUI dialog window 300 also includes a "number of levels" window. This window allows a user to specify the number of levels of hyperlinks to search for the search parameters. In applications where a web site is being characterized, the number of levels may indicate a number of levels to characterize, or may be set to "max domain." The "max domain" setting instructs the markup language processor 235 to keep searching without a specified depth, but not to follow any hyperlinks leading out of a given domain. This is useful for searching an entire web site. An optional "local limit" button 325 may be used to allow the user to set the "number of levels" parameter to max, while limiting the search to a local network domain. The local network domain may optionally be specified in terms of a URL. For example, the local domain may involve all network addresses whose root is http://www.abc_company.com/.

The GUI 300 optionally includes a 1→→N window 315. This window allows a user to specify how many "next page" links to follow. For example in a results page, the search may be specified as one level deep, except the search will follow the "next page" link until the end of the results page is reached. Alternatively the user may only desire to evaluate the first ten pages, especially if the pages are arranged from most probable to least probable as is common with most search engines. This parameter is generally set to a number of "next page" links to follow. The default is preferably set to "max."

The multilevel GUI 300 also includes a "find next" button. This is used to allow the user to seek the next instance of the search criterion being met. This is similar to prior art "find next" buttons that work in document word searches. The "find next" button of the present invention is able to work across hyperlink boundaries. Moreover, it can be used to search for concepts other than simple words. This function may be used in a single document as well. In a preferred embodiment, the present invention will highlight or otherwise move to a paragraph whose words satisfy a Boolean keyword expression.

The print on/off control 300 may involve an options pull-down menu. The print on/off may be used to specify to print all pages scanned in a search. For example a user may wish to print all pages from a company's web site. Pull-down options allow a user to be more selective in only printing pages meeting the search criterion.

The options menu 335 is preferably a pull down menu providing further options. For example a user may with to build a tree structured map of a given web site. Certain information may be desired about each node in the map. For example the number and titles of pdf files linked to at each node may be of interest. Also, the user may with to download all pdf files meeting a certain criterion. The options menu allows for future expansion. Various other web-based functions may be automated using the options menu. Other options possibilities will become apparent in connection with the discussions of FIGS. 4 and 5. The GUI 300 may be developed using known techniques to provide control of the functionality discussed in connection with FIGS. 4 and 5. Likewise, other options may be added to save users time in web-page manipulation oriented tasks by following the general teachings of the present invention.

One example how the options menu may be used is to enable a user to find a PowerPoint™ presentation about a certain subject. The user may enter in a set of keywords to a network search engine. This may result in thousands of hits. Now the user may specify to build a map of all pages reachable from up to three levels of hyperlinks from any of the pages returned in the search results. In this case the user specifies to build a sitemap file containing all pages including hyperlinks to files with a .ppt extension. When the map page is constructed, the user may click on a given link in the map page to access the link. Alternatively the results can be showed to the user one at a time, and the user can press the "find next" button 320 to move to the next node having a .ppt file. While the user is reviewing a first result the browser preferably continues the search for one or more subsequent results in the background. More details regarding methods to construct map page documents are provided in connection with FIGS. 4 and 5.

Figure 4:
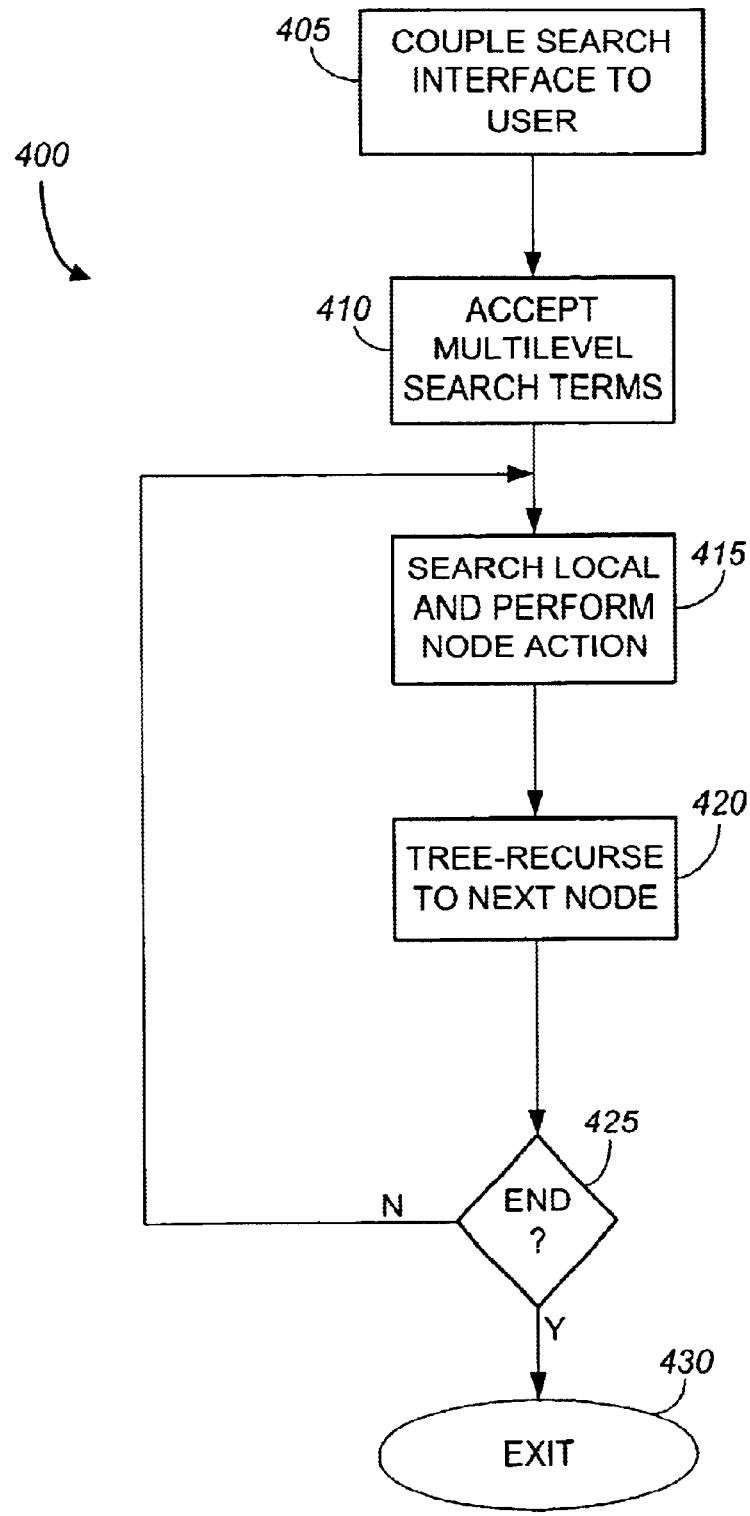
FIG. 4 is a flow chart illustrating methods of browsing involving an automated recursive tree-walking process.

Referring now to FIG. 4, a method 400 is illustrated in block diagram form. This method is performed by the web browser 200 and is coded into the browser module 120. Note that the method 400 may also be implemented by a processor plug-in module. In XML based systems, the method 400 may be optionally encoded directly into an XML accessed by an XML based browser. That is, in XML systems, browser functionality may be added by XML documents containing program code without the need for a plug-in module. All such embodiments are contemplated by the present invention.

In a first step 405, a multilevel search interface is coupled to a user. The multilevel search interface may be a constructed similarly to the GUI window 300. In a given system the step 405 may involve a VXML IVR interface or a more specialized interface including special buttons. Also "hot keys" or "short cuts" as are known in the art may be employed. The step 405 accepts user inputs to allow the user to interact with the method 400 in order to specify a set of multilevel search parameters. These preferably involve at least some of the parameters discussed in connection with FIG. 3.

In a second step 410 the multilevel search parameters are accepted. These multilevel search parameters are used to configure a search program that is executed by the markup language processor 235. In a third step 415 the multilevel search parameters are applied to a local node. The local node corresponds to the web page that has most recently been accessed and has been processed by the markup language parser 220. For example, the web browser 200 displays the root node's web page on the display 130 while steps 405 and 410 are being executed. Once the search begins, the markup language processor causes other pages to be accessed, and the currently accessed page is called the "local node." The step 415 may be optionally skipped or executed on the root node.

The step 415 involves evaluating the markup document corresponding to the local node and performing a node action. The node action may involve searching the local node for a word, concept, link to file type, or other designated set of search criteria. This generally involves parsing the local node document, extracting tagged substructures, and interpreting them in the context of the markup grammar. That is, the step 415 generally can search text and can search for text within specific types of tags. This allows the search engine to be able to specifically search for hyperlinks to certain file types, extract headings, and provide other functions as are subsequently discussed. In one example the node action is to display the part of the page meeting the search criteria to the user and wait until the "find next" button is pressed before continuing. While waiting for the "find next" button to be pressed, this exemplary node action continues the search in the background to prevent the user from having to wait for subsequent hyperlinks to be accessed.

In another embodiment, the node action may involve logging information into a sitemap document. The sitemap document may similarly be constructed as a filtered results summary document, whereby the filter uses a browser-controlled multilevel set of search criteria. In this type of embodiment the markup language processor 235 works with the markup language parser to continue to search through all nodes and keeps a record of a tree structure or list of hyperlinks to nodes that meet the search criterion. In this case the method usually continues along without the need for the user to issue the "find next" command. Other node actions may involve downloading files of certain types or printing out web pages. Further details of building sitemap documents and filtered results summary documents are described in connection with FIG. 5.

Depending on the multilevel search configuration, either after the "find next" command is issued or automatically, control next passes to a fourth step 420. In the step 420 a tree recursion is performed to select a next local node. For example, the next local node is generally the next hyperlink in a given base page. The tree may be searched using a depth-first or a breadth-first technique for example. The step 420 generally involves maintaining a return-stack as is known in the art in order to move back up the tree when a boundary is reached. For example when a three-level search is underway, the current local node is a level-two node, and all of the hyperlinks in the level-two node are exhausted, the next local node is the next hyperlink in the parent level-one node. Recursive tree and linked list traversing algorithms are well known in the art of computer science and any such algorithm may be used to implement the step 420. Before any hyperlink is accessed, it is preferably compared to a history list and skipped if it would cause a loop. This ensures the integrity of a loop-free tree structure.

After the step 420, a condition 425 is evaluated. The condition 425 determines whether all of the nodes specified by the multilevel search have been processed. If not, control passes back into the step 415. If so, control passes to an exit point 430. Depending on the embodiment and/or multilevel search settings, at the end of the method 400 the user will either have viewed all of the results, or will have a sitemap or filtered results document. The sitemap and filtered results document structures include a structured set of hyperlinks to all pages meeting the search criteria. In some cases the search criterion may be left open to cause a sitemap to be built to all pages in a given domain. Also, if certain options such as print or download options were specified, those actions will also have been completed or may still be underway when the exit point 430 is reached.

The present invention contemplates a wide variety of possible node actions that be performed during the step 415. For example a user may wish to sequentially step through/view all .gif or all .mpg image files on pages meeting certain criteria. A user may also wish to build a local map of those pages and be able to view the images at a later time. In such a case the process builds an image tree. Preferably this operation may occur in the background so the user can move to another window and perform other tasks or perform other tasks with the same browser during these background operations. Other examples of node actions that can be performed during the step 415 include but are not limited to: 1) display text to user, wait for a "find next" command, and keep doing this until the end of each document is reached; 2) link URL of current node to a site-map structure; 3) link URLs of files found on current node and having a specified type(s) to the sitemap structure, for example to .pdf or .ppt files; 4) generate a headings list for the current node in the site-map structure; 5) print out current web page; 5) download one or more linked files of a specified file type to a local directory; 6) display an image file; 7) add the URL and title information to a filtered search results output list-page.

Number 4) above is an example of mark-up specific searching. In this example the search parameter involves not a keyword but a tag type. The markup processor 235 searches for headings tags found in the parsed markup file stream. When a heading is found, it is loaded into the site-map file. This provides a table of contents structure for the web site. Additional mark-up may be added by the markup processor 225 make the output look like a table of contents, for example. The generated map is preferably presented as an HTML or a given type of XML document. The markup language processor 235 preferably translates each heading into a hyperlink tag structure marked with appropriate entry point to the heading in the document in which it was found. This way the user viewing the map may select a given heading in order to access a portion of a document corresponding to the heading.

Figure 5:
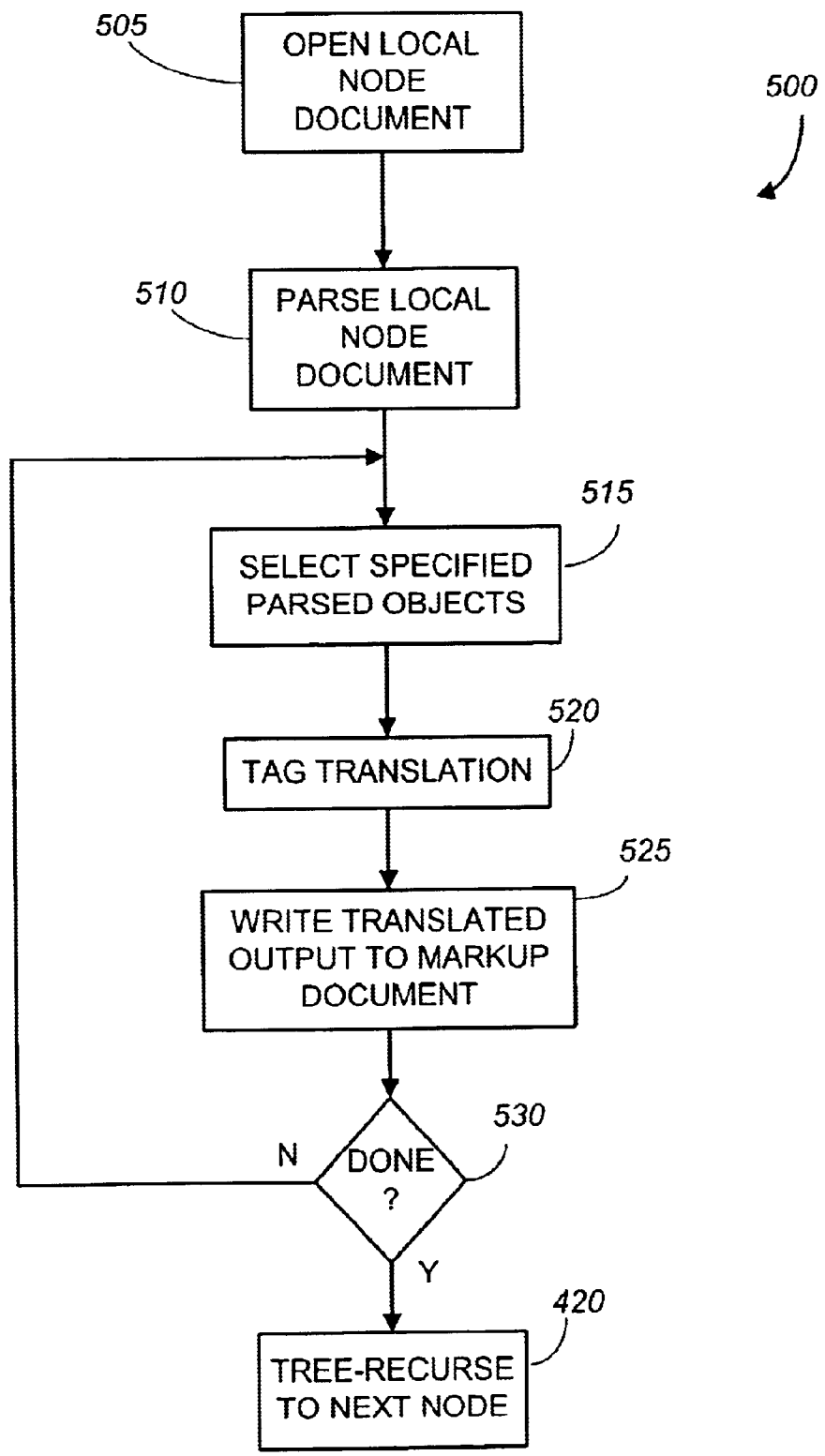
FIG. 5 is a flow chart illustrating a sub-method of building a site-map document.

Referring now to FIG. 5, an embodiment of a method of building a sitemap 500 is illustrated in block diagram form. The method 500 can also be used to generate a filtered results page. A "filtered results page" is similar to a sitemap but only includes pages meeting a given set of criteria. In general a filtered results page may be applied to a search engine's results pages or to a web site. The filtering operation builds a map but only includes pages of particular interest to a user. In some cases the sitemap or filtered results page may be arranged as a list of hyperlinks with ancillary information, and in other cases the sitemap or filtered results page may be arranged according to a tree structure. In a preferred embodiment, the sitemap output is formatted to look like a table of contents. The filtered results are preferably formatted to look like a search engine results page. In general the concepts of a sitemap, a filtered results page, and a filtered sitemap are all special cases of the concept of a sitemap. Filters may be applied to prune out unwanted results using browser-controlled, second level searching techniques.

The method 500 corresponds to one exemplary embodiment of the step 415 of the method 400. That is, the method 500 is preferably wrapped into a control loop as specified by the method 400. When configured in this way, the step 410 also includes the step of setting up an output document to hold the sitemap. This is typically performed by opening a new markup language output document to hold the sitemap information. The step 410 then also involves writing a set of document tags and any other document header information needed to initialize a new markup document. In this case the markup language processor 235 is operative to write output to an output file structure 240. In a preferred embodiment, the step 410 opens an HTML document. In another preferred embodiment the step 410 involves opening an XML document with an associated document type definition.

To build a sitemap, then, the method 400 is applied with the step 410 augmented as described above. The method 400 proceeds whereby the step 415 involves linking a node into a tree structure. During site-mapping operations, the step 420 is preferably performed using a depth-first ordering policy. During sitemap or filtered sitemap building operations, when the step 415 is called in the method 400, the method 500 as described below is invoked.

In a step 505 a local node is accessed and opened. The local node corresponds to the current markup document in the search. The local node starts at the root node of the search and is thenceforth determined by the step 420. In a second step 510 the information of the local node is parsed. The local node generally corresponds to a markup document. Control next passes to a third step 515 that scans the parsed document for specified types of information. This may involve search-text, tag types (e.g. headings tags), file types or other specified criteria. Note that the steps 510 and 515 may be merged so that parsing and searching are performed in a pipelined sequential order. The block diagram of FIG. 5 represents only one possible ordering, and other orderings would be apparent to skilled artisans.

Control next passes to a fourth step 520. In the fourth step 520 the information extracted from the local-node document is passed through a tag translation. The tag translation may generally involve switching from one set of tags to another. This step may also involve encapsulating a first set of tags into another set of tags. A null translation may also be applied, whereby no translation is performed. An example of a tag translation is when each headings tag is being added to the site-map output document. These tags may be encapsulated in hyperlink tags and URL/URI information may be added to the hyperlink tags so that when a user selects a heading, the browser brings up the local-node document and displays the portion of that document containing the heading to the user. An example where a null translation may be used is when the parsed object corresponds to a downloadable file whose file name is already nested within in a hyperlinked set of tags.

Control next passes to a fifth step 525 where the selected parsed and translated objects are written to the output markup file structure. After the writing is complete, control is determined by a decision 530. If the end tags of the parsed document are encountered control passes to the step 420. Otherwise control passes back to the step 515 where scanning through the parsed document continues. In an alternative embodiment control passes back to the step 510 and continued parsing is interleaved with the selecting, translation and writing operations.

Figure 6:
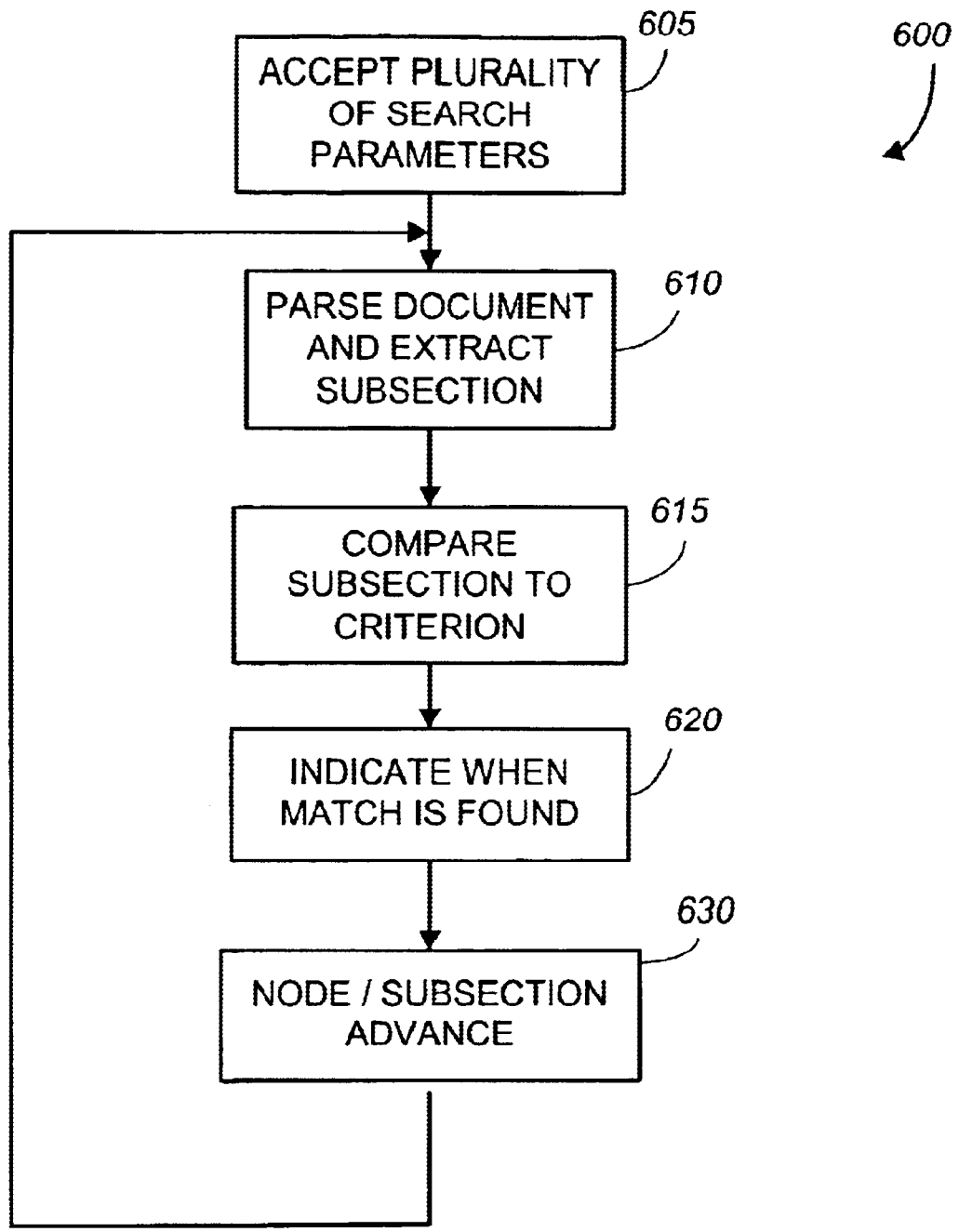
FIG. 6 is a flow chart illustrating a method of searching a document.

Referring now to FIG. 6, a method of searching a document 600 is illustrated in flow chart form. This method improves on prior art "find in page" search functions and is also used in multilevel searches. In a first step a plurality of search parameters are accepted from a user. In a second step 610, a document is parsed and subsections are extracted therefrom. If the document is already open, parsing typically begins from the point where the user presently has the text-input marker or cursor. A subsection may be a paragraph in a word processing document, a cell in a spreadsheet, or any specified tagged object type in a markup document. The subsection may be tag-type independent, i.e., the subsection may be a paragraph or a heading.

In a third step 615 the subsection is treated as a sub-document and a search criterion is applied to the subsection. For example the search be specified as "dog AND tail" or "dog WITHIN 10 WORDS of tail." The step 615 compares each parsed subsection to the search criterion. In a fourth step 620 match results are indicated to the user. For example the subsection of the document matching the search criterion is displayed on the output screen 130. If no match is found, the step 620 performs a null operation. If no match is found, or the user hits the "find next" button, control next passes to a fifth step 630. In the sixth step 630, the parser advances to the next subsection and control next passes to the second step 610. If this search technique is used within a multilevel document structure and a hyperlink is encountered, the sixth step 630 performs the node-advance similarly to the step 420.

It should be noted that while prior art document search mechanisms provide "find in page," they lack the ability for a user to search subsections of the document using a more sophisticated search as described above. This inability leads to user inefficiencies and lack of control in manipulating single and hyperlinked document structures. This aspect of the present invention hence solves an important problem with a latent need.

Although the present invention has been described with reference to specific embodiments, other embodiments may occur to those skilled in the art without deviating from the intended scope. Therefore, it is to be understood that the invention herein encompasses all such embodiments that do not depart from the spirit and scope of the invention as defined in the appended claims.

What is claimed is:

1. A multilevel-search browser module comprising:

an application layer interface coupled to a protocol stack;

a markup language parser coupled to receive information from said application layer interface;

a user interface for interacting with a user;

a multilevel search control interface, said multilevel search control interface including a first input to receive a first parameter that is related to content, and a second input to receive a second parameter that identifies how a set of hyperlinks are to be accessed, so as to define a linked set of documents; and a markup language processor coupled to receive a first input from said markup language parser and said first and second parameters from said multilevel search control interface;

wherein said markup language processor is operative to sequentially access said linked set of documents using said second parameter, evaluate textual information contained within each sequentially accessed document, compare said textual information with said first parameter, and selectively couple to an output information related to one or more documents in said linked set of documents for which the comparison provides an affirmative result;

wherein the set of information selectively coupled to the output is guaranteed to be limited to a subset of the linked set of documents defined by the second parameter that further include textual content as defined by the first parameter; and wherein the first parameter is not re-entered into any embedded search engines found in the linked set of documents to extend the search beyond the linked set of documents.

2. The browser of claim 1, wherein said user interface comprises a window display providing an interactive menu to a user.

3. The browser of claim 2, wherein said user interface is a part of a windows based graphical user interface.

4. The browser of claim 1, where said user interface comprises a voice interface.

5. A multilevel-search browser plug-in module for coupling to a host browser, whereby the host browser includes an application layer communications interface, a markup language parser, and a user interface for coupling to a user, the plug-in module comprising:

a multilevel search control interface, said multilevel search control interface including a first input to receive a first parameter that is related to content, and a second input to receive a second parameter that identifies how a set of hyperlinks are to be accessed, so as to define a linked set of documents;

a markup language processor coupled to receive a first input from said markup language parser, and said first and second parameters from said multilevel search control interface;

wherein said markup language processor is operative to sequentially access said linked set of documents using said second parameter, evaluate textual information contained within each sequentially accessed document, compare said textual information with said first parameter, and selectively couple to an output information related to one or more documents in said linked set of documents for which the comparison provides an affirmative result;

wherein the set of information selectively coupled to the output is guaranteed to be limited to a subset of the linked set of documents defined by the second parameter that further include textual content as defined by the first parameter; and wherein the first parameter is not re-entered into any embedded search engines found in the linked set of documents to extend the search beyond the linked set of documents.

6. The plug-in module of claim 5, wherein said plug-in module is embodied as JAVA code.

7. The plug-in module of claim 5, wherein said plug-in module is embodied as executable XML code.

8. A computerized device comprising:

a processor;

a memory coupled to said processor;

a display device;

a network interface;

a multilevel browser module comprising:

an application layer interface, said application layer interface for coupling to a protocol stack;

a markup language parser coupled to receive information from said application layer interface;

a user interface comprising input and output devices for interacting with a user;

a multilevel search control interface, said multilevel search control interface including a first input to receive a first parameter that is related to content, and a second input to receive a second parameter that identifies how a set of hyperlinks are to be accessed, so as to define a linked set of documents;

a markup language processor coupled to receive a first input from said markup language parser, and said first and second parameters from said multilevel search control interface;

wherein said markup language processor is operative to sequentially access said linked set of documents using said second parameter, evaluate textual information contained within each sequentially accessed document, compare said textual information with said first parameter, and selectively couple to an output information related to one or more documents in said linked set of documents for which the comparison provides an affirmative result;

wherein the set of information selectively coupled to the output is guaranteed to be limited to a subset of the linked set of documents defined by the second parameter; and wherein the first parameter is not re-entered into any embedded search engines found in the linked set of documents to extend the search beyond the linked set of documents.

9. For use in a client browser device, a method comprising:

accepting a first parameter that is related to content;

accepting a second parameter that identifies how a set of hyperlinks are to be accessed, so as to define a linked set of documents;

accessing a first markup language document and scanning said document to determine a hyperlink contained therein;

based on said second parameter, selectively activating said hyperlink found in said step of accessing;

retrieving at least a portion of a second markup document associated with said hyperlink; and comparing the contents of said at least a portion of said second markup document to at least a portion of said first parameter; and when the comparing provides an affirmative result, selectively coupling to an output information related to said second markup document;

wherein the set of information selectively coupled to the output is guaranteed to be limited to a subset of the linked set of documents defined by the second parameter; and wherein the first parameter is not reentered into any embedded search engines found in the linked set of documents to extend the search beyond the linked set of documents.

10. The method of claim 9, wherein said second parameter comprises a set of subparameters.

11. The method of claim 9, wherein said first parameter includes a character string and said second parameter includes an indication of the number of levels to search.

12. The method of claim 9, wherein said first parameter includes a Boolean keyword expression and said second parameter includes an indication of the number of levels to search.

13. The method of claim 9, further comprising:
checking to see if the search is complete, and if it is not, accessing a next hyperlink and repeating the steps of activating, retrieving, and comparing, and checking.

14. The method of claim 9, wherein said output corresponds to a user interface output device, and the method further comprises:
when said information has been selectively coupled to said output, awaiting a find-next signal, and when said find-next signal is received, checking to see if the search is complete, and if it is not, accessing a next hyperlink and repeating the steps of activating, retrieving, comparing, selective coupling, and checking.

15. The method of claim 13, wherein the checking to see if the search is complete further comprises:
comparing remaining words in the retrieved mark-up language page to at least one subparameter of said first parameter.

16. The method of claim 13, wherein said accessing a next hyperlink is performed in the background while a current result is being made available at said output.

17. The method of claim 13, wherein said first parameter includes a Boolean keyword expression, and said second parameter includes an indication of the number of levels to search, and an indication to continue the search on a designated-next-linked page.

18. For use in a client side browser, a method of gathering a set of filtered information from an information network, comprising:
providing a user interface;
accepting from said user interface a first parameter that is related to content;
accepting from said user interface a second parameter that identifies a hyperlink accessing rule, so as to define a linked set of documents;
performing a sequence of client-server interactions to access at least a subset of said linked set of documents using said hyperlink accessing rule;
for each document in said subset, extracting information related to said document and comparing said information with said first parameter; and
for each document in said subset for which the comparing identifies an affirmative correlation, coupling at least a portion of said document to an output;
wherein a set of information selectively coupled to the output is guaranteed to be limited to a subset of the linked set of documents defined by the second parameter; and
wherein the first parameter is not re-entered into any embedded search engines found in the linked set of documents, to extend the search beyond the linked set of documents.

19. The method of claim 18, wherein said output is a display associated with said user interface.

20. The method of claim 18, wherein said output is a markup document.

21. The method of claim 20, wherein said markup document conforms with at least a dialect of XML.

22. The method of claim 18, wherein said output is coupled to a printer and directs the subset of documents associated with the output to be printed.

23. The method of claim 18, wherein said output is coupled to a storage device and directs the subset of documents associated with the output to be written to local storage.

24. The method of claim 18, wherein said hyperlink accessing rule involves at least a sub rule that causes hyperlink accesses outside of a given domain to be excluded from the set of linked documents.

25. The method of claim 18, wherein said hyperlink accessing rule involves least a sub rule that causes the hyperlink corresponding to the next page in a set of results pages to be accessed.

26. The method of claim 18, wherein said hyperlink accessing rule involves at least a sub rule that causes a sequence of hyperlinks corresponding to a sequence of next-page links in a set of results pages to be accessed.

27. The method of claim 18, wherein said hyperlink accessing rule involves at least a sub rule that causes a sequence of hyperlinks corresponding to a sequence of next-page links in a set of results pages to be accessed, and the output is written to a markup document.

28. The method of claim 18, wherein said hyperlink accessing rule involves at least a sub rule that causes a sequence of hyperlinks corresponding to a sequence of next-page links in a set of results pages to be accessed, and the output is displayed to the user via said user interface.

29. The method of claim 18, wherein said second parameter includes at least two subparameters.

30. The method of claim 29, wherein said two subparameters include at least two of a number of link levels to search, a local limit indication, and a number of next-page links to follow.

31. The method of claim 1, wherein the first parameter includes an indication of a tag type so that textual information is only checked within the indicated tag type.

32. The method of claim 5, wherein the first parameter includes an indication of a tag type so that textual information is only checked within the indicated tag type.

33. The method of claim 8, wherein the first parameter includes an indication of a tag type so that textual information is only checked within the indicated tag type.

34. The method of claim 9, wherein the first parameter includes an indication of a tag type so that textual information is only checked within the indicated tag type.

35. The method of claim 18, wherein the first parameter includes an indication of a tag type so that textual information is only checked within the indicated tag type.

* * * * *